United States Patent
Alexander et al.

(10) Patent No.: US 11,155,127 B2
(45) Date of Patent: Oct. 26, 2021

(54) METHOD FOR OPERATING A TIRE PRESSURE MONITORING UNIT AND TIRE PRESSURE MONITORING SYSTEM

(71) Applicant: Huf Hülsbeck & Fürst GmbH & Co. KG, Velbert (DE)

(72) Inventors: Markus Alexander, Rheinstetten (DE); Markus Wagner, Ludwigsburg (DE)

(73) Assignee: HUF BAOLONG ELECTRONICS BRETTEN GMBH, Bretten (DE)

( * ) Notice: Subject to any disclaimer, the term of this patent is extended or adjusted under 35 U.S.C. 154(b) by 0 days.

(21) Appl. No.: 16/393,962

(22) Filed: Apr. 25, 2019

(65) Prior Publication Data

US 2019/0248194 A1    Aug. 15, 2019

Related U.S. Application Data

(63) Continuation of application No. PCT/EP2017/076194, filed on Oct. 13, 2017.

(30) Foreign Application Priority Data

Oct. 26, 2016    (DE) .................... 10 2016 120 457.9

(51) Int. Cl.
    *B60C 23/04*    (2006.01)
(52) U.S. Cl.
    CPC ...... *B60C 23/0474* (2013.01); *B60C 23/0416* (2013.01); *B60C 23/0455* (2013.01);
    (Continued)
(58) Field of Classification Search
    CPC ..... B60C 23/02; B60C 23/04; B60C 23/0408; B60C 23/0416; B60C 23/0455;
    (Continued)

(56) References Cited

U.S. PATENT DOCUMENTS 7,362,218 B2 * 4/2008 McCall ............... B60C 23/0408
                                                 152/152.1
8,593,273 B2 * 11/2013 Gotschlich .......... B60C 23/0488
                                                 340/445
(Continued)

FOREIGN PATENT DOCUMENTS

DE    10 2009 045 305 A1    4/2011
DE    10 2010 037 512 A1    3/2012
DE    11 2013 003 908 T5    5/2015

*Primary Examiner* — Stephen R Burgdorf
(74) *Attorney, Agent, or Firm* — Hackler Daghighian Martino & Novak (57) ABSTRACT

A tire pressure monitoring unit is mounted on a vehicle wheel having a pressure and acceleration sensor. A method for assigning wheel positions includes pressure and acceleration data determined from the sensors. The pressure data and at least one piece of information derived from the acceleration data are transmitted wirelessly in a data telegram together with a characteristic identifier. Information concerning the reliability of the information derived from the acceleration data is acquired in the tire pressure monitoring unit on the basis of the measurements and is transmitted with the data telegram. A central evaluation unit considers a plurality of data telegrams and, taking account of data from the ABS sensors, assigns the individual tire pressure monitoring units to wheel positions. Data telegrams in which the reliability is higher receive a greater weighting, and data telegrams in which the reliability is smaller receive a smaller weighting.

10 Claims, 5 Drawing Sheets

(52) U.S. Cl.
CPC ...... *B60C 23/0488* (2013.01); *B60C 23/0489* (2013.01); *B60T 2240/03* (2013.01); *B60T 2270/10* (2013.01)

(58) Field of Classification Search
CPC ............ B60C 23/0462; B60C 23/0474; B60C 23/0481; B60C 23/0488; B60C 23/0489; B60C 23/061; B60T 8/1725; B60T 2240/03; B60T 2270/10; G01M 17/02
USPC .......................................................... 340/445
See application file for complete search history.

(56) References Cited

U.S. PATENT DOCUMENTS

| | | | |
|---|---|---|---|
| 8,751,190 B2 | 6/2014 | Geisler et al. | |
| 8,791,807 B2 | 7/2014 | Kessler et al. | |
| 9,434,217 B2 | 9/2016 | Mori et al. | |
| 2004/0217854 A1* | 11/2004 | Hirohama | B60C 23/0416 340/445 |
| 2005/0179530 A1* | 8/2005 | Stewart | B60C 23/0416 340/447 |
| 2006/0012469 A1* | 1/2006 | Hirai | B60C 23/0416 340/445 |
| 2006/0055524 A1* | 3/2006 | Okubo | B60C 23/0464 340/445 |
| 2008/0055059 A1* | 3/2008 | Murakami | B60C 23/0408 340/442 |
| 2011/0082663 A1 | 4/2011 | Geisler et al. | |
| 2011/0209536 A1 | 9/2011 | Craig et al. | |
| 2011/0246101 A1* | 10/2011 | Araki | B60C 23/0462 702/50 |
| 2012/0060598 A1 | 3/2012 | Kessler et al. | |
| 2013/0169428 A1* | 7/2013 | Shima | B60C 23/02 340/447 |
| 2013/0327136 A1* | 12/2013 | Kretschmann | B60C 23/0488 73/146.3 |
| 2014/0070936 A1* | 3/2014 | Schwab | B60C 23/0481 340/447 |
| 2014/0167950 A1* | 6/2014 | Shima | B60C 23/0447 340/447 |
| 2014/0180527 A1* | 6/2014 | Kosugi | B60C 23/0457 701/29.4 |
| 2015/0057876 A1* | 2/2015 | Graham | B60C 23/0416 701/33.4 |
| 2015/0057878 A1* | 2/2015 | Friel | B60C 23/00 701/34.4 |
| 2015/0191056 A1 | 7/2015 | Mori et al. | |
| 2016/0297262 A1 | 10/2016 | Tsuchikawa et al. | |
| 2016/0298263 A1 | 10/2016 | Ishikawa et al. | |
| 2020/0122530 A1* | 4/2020 | Ga | B60C 23/062 |

* cited by examiner

METHOD FOR OPERATING A TIRE PRESSURE MONITORING UNIT AND TIRE PRESSURE MONITORING SYSTEM

CROSS-REFERENCE TO RELATED APPLICATIONS

This continuation application claims priority to PCT/EP2017/076194 filed on Oct. 13, 2017 which has published as WO 2018/077631 A1 and also the German application number 10 2016 120 457.9 filed on Oct. 26, 2016, the entire contents of which are fully incorporated herein with these references.

DESCRIPTION

Field of the Invention

The invention is based on a method with the features stated in the preamble of claim 1, such as is known for example from DE 11 2013 003 908 T5.

Background of the Invention

Tire pressure monitoring units of a vehicle usually contain, apart from sensors for measuring the tire pressure, further sensors, for example temperature and acceleration sensors. Data ascertained with these sensors are transmitted from tire pressure monitoring units wirelessly in a data telegram to an evaluation unit of the vehicle. Such a data telegram contains a characteristic identifier of the tire pressure monitoring unit concerned and various fields, in which various data, for example pressure data or temperature data, are entered.

In order to reduce the data volume to be transmitted, a first evaluation of measured data is carried out in the tire pressure monitoring unit. For example, by repeatedly measuring a parameter such as pressure or temperature at very short intervals after one another and then sending a mean value. The intervals between the individual measurements are selected so short that a relevant change in the measured variable between the individual measurements cannot take place. If the individual measured values nonetheless diverge too greatly from one another, this indicates that at the present time a reliable measurement is not possible on account of interfering influences. Measurements of the acceleration of a wheel, for example, are used to determine the direction of rotation. The direction of rotation is usually determined from the phase position of the signals from two acceleration sensors, which requires a plurality of measurements. Interfering influences can lead to the phase position not being able to be determined unambiguously in the time available up to the transmission of the next data telegram, by means of a predefined number of measurements.

If a tire pressure monitoring unit ascertains that the present measured values do not enable a reliable indication, the data field concerned remains empty in conventional systems, i.e. contains for example the value zero, in order that false information is not transmitted to the central evaluation unit. Especially in the case of extremely noisy measurement signals, such as delivered by acceleration sensors for example when travelling over bumpy roads, it may happen that in several successive data telegrams of a tire pressure monitoring unit, no data of the sensor concerned are transmitted and the central evaluation unit, despite extensive transmission activity of the tire pressure monitoring unit, does not therefore receive any information concerning the direction of rotation or any other variable which at the time is difficult to determine.

An object of the present invention is to indicate a way in which the central evaluation unit of a tire pressure monitoring system can quickly be informed about all relevant physical variables of a vehicle tire even under adverse conditions.

This problem is solved by a method with the features stated in claim 1 and by a corresponding system. Advantageous developments of the invention are the subject-matter of dependent claims.

SUMMARY OF THE INVENTION

According to the invention, the tire pressure monitoring unit determines from a plurality of measurements information concerning the reliability of pressure data and and/or information derived from acceleration data and transmits this information in a data telegram together with the pressure data and the information derived from the acceleration data. The information derived from the acceleration data can relate for example to the direction of rotation of the wheel concerned or to the wheel position at a specific point in time, for example at the start of the data telegram. If information concerning the reliability of the pressure data is to be obtained, a plurality of measurements is carried out for this purpose by the pressure sensor and evaluated. When information concerning the reliability of information derived from the acceleration data is to be obtained, a plurality of measurements of at least one acceleration sensor is required for this.

In the simplest case, the information concerning the reliability can be contained in the data telegram as a flag, i.e. a single bit, i.e. it can be indicated whether for example the information concerning the direction of rotation is reliable or unreliable. Information concerning the reliability can however also indicate an error interval or a probability value.

The information additionally contained in the data telegram concerning the reliability of the pressure data or other data permits a central evaluation unit to acquire reliable information using additional data. The additional data can for example originate from earlier data telegrams of the tire pressure monitoring unit concerned or another tire pressure monitoring unit or from other sensors of the vehicle, for example ABS sensors.

For example, when a tire pressure monitoring unit wishes to determine the direction of rotation from the phase position of two acceleration signals, it may happen, on account of interfering influences, that 9 of 15 measurements indicate the phase position of an anticlockwise-rotating wheel and 6 of 15 measurements the phase position of a clockwise-rotating wheel. Overall, such a result points to the fact that the wheel is rotating clockwise, but this is not certain. If however three or more successive data telegrams contain comparable information, which in each case make an anticlockwise rotation of the wheel appear somewhat more likely than a clockwise rotation, it can generally be assumed with great reliability that the wheel is rotating anticlockwise.

Alternatively or in addition, the evaluation of a data telegram can also take place using data from other sensors of the vehicle. For example, to assign the characteristic identifier of a tire pressure monitoring unit to a specific wheel position (e.g. front right), use can be made of data from an ABS sensor. During travel, the different wheels of a vehicle often do not in fact rotate in a precisely identical manner. If the wheel rotations which are determined by a tire pressure monitoring unit from acceleration signals agree with wheel rotations determined by an ABS sensor, it can therefore be concluded that the ABS sensor concerned and the tire pressure monitoring unit belong to the same wheel position. For this purpose, a rotation angle position of the wheel at a set-point start of transmission can for example be defined, so that the tire pressure monitoring unit only starts the transmission of a data telegram when, by an evaluation of an acceleration signal available to it, it arrives at the result that this defined rotation angle position for the set-point start of transmission has now been reached. The determination of the rotation angle position is bound up with more or less uncertainty. In fact, the tire pressure monitoring unit can only guarantee that the transmission of a data telegram can be started when the wheel has a rotation angle position which lies in a more or less large interval, in which the defined rotation angle position for the set-point start of transmission is contained. As information concerning the reliability, a data telegram can contain information as to the size of the interval concerned.

BRIEF DESCRIPTION OF THE DRAWINGS

Further details and advantages of the invention are explained with examples of embodiment making reference to the appended drawings. Identical components and components corresponding to one another are denoted by corresponding reference numbers therein. In the figures.

DETAILED DESCRIPTION OF THE PREFERRED EMBODIMENTS

Figure 1:
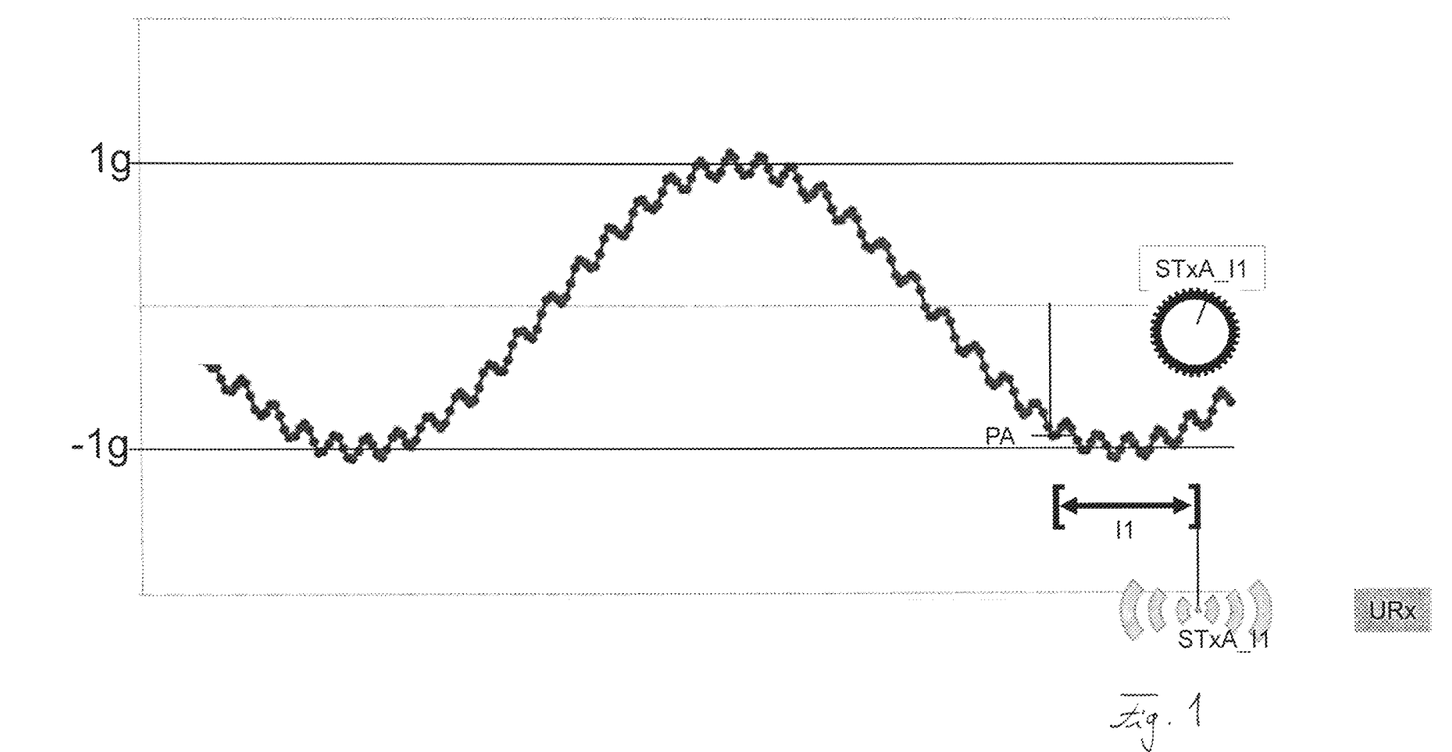
FIG. 1 shows a diagrammatic representation of a signal of an acceleration sensor with a weak interference.

The acceleration sensor of a rotating wheel delivers a sinusoidal signal, which is superimposed by interferences, which are generated for example by vibrations of the wheel or impacts due to unevenness in the road. An example of the signal of an acceleration sensor is plotted diagrammatically over the time in FIG. 1, wherein the course of the signal is subjected to only slight interferences. In an ideal course of the signal, the signal of the acceleration sensor reaches the value $-1g$ (g=acceleration due to gravity) only in a single precisely defined rotation angle position of the wheel. The effect of the interferences is that the wheel position belonging to signal value $-1g$ can only be ascertained with a degree of uncertainty, which is indicated in FIG. 1 by interval I1.

Figure 2:
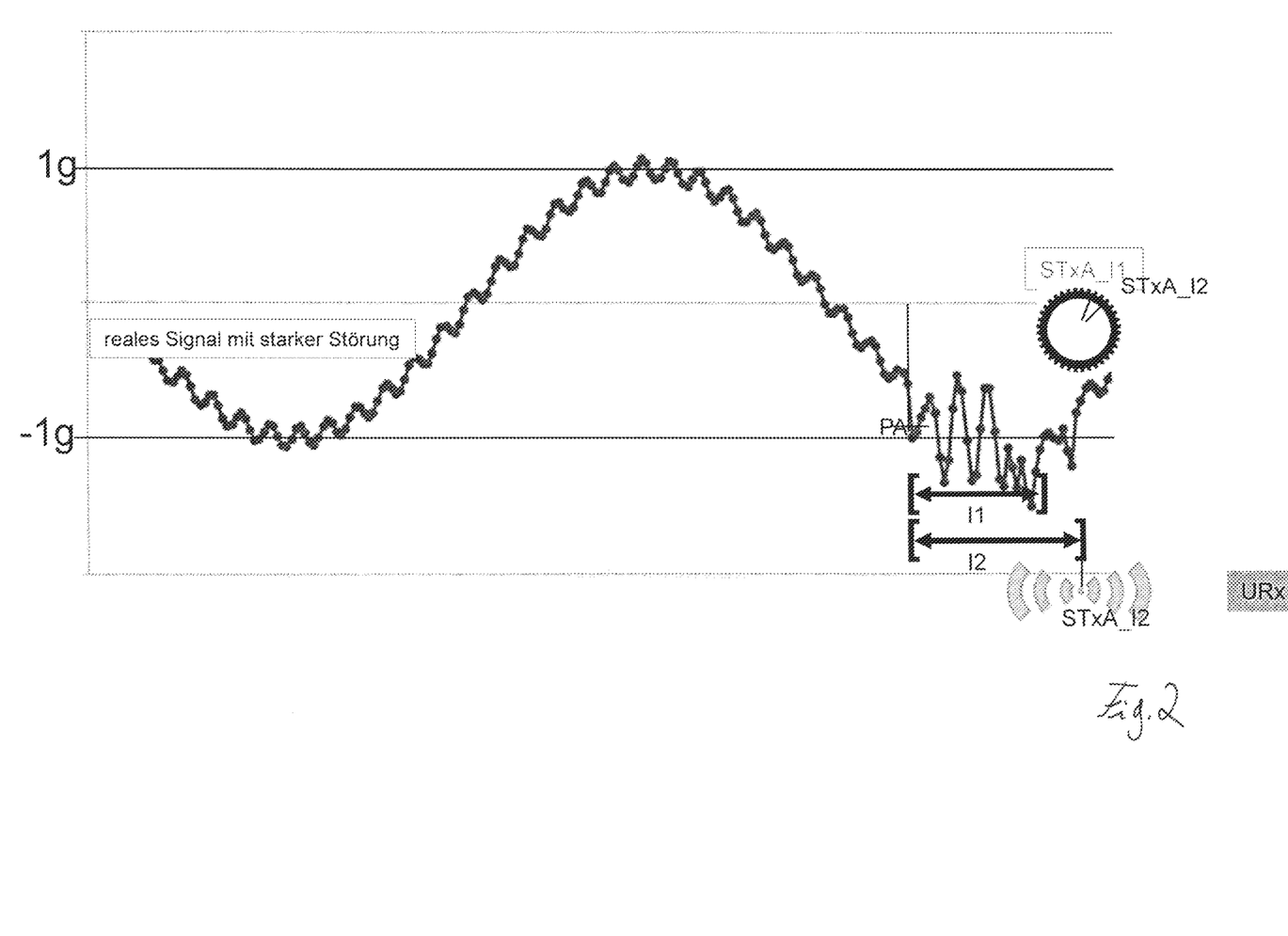
FIG. 2 shows a diagrammatic representation of a signal of an acceleration sensor with a strong interference.

For the purpose of comparison, a signal of an acceleration sensor is represented in FIG. 2, which, in the section of interest here in which the acceleration signal reaches the value $-1g$, is severely disrupted. In the example of FIG. 2, it can therefore only be ascertained with a much greater degree of uncertainty when the wheel has the rotation angle position which with the ideal course of the signal belongs to acceleration value $-1g$. This greater uncertainty is indicated by a greater interval I2.

Due to the fact that data telegrams from tire pressure monitoring units are transmitted only at a predefined rotation angle position for a set-point start of transmission, it is possible, by synchronisation with the data from ABS sensors, for an assignment of the individual tire pressure monitoring units to the different wheel positions of the vehicle to take place. The individual wheels of a vehicle in fact rotate slightly differently for various reasons.

A tire pressure monitoring unit can for example be operated in such a way that a data telegram is only to be transmitted when the tire pressure monitoring unit, on the basis of the acceleration data available to it, concludes that the wheel now has a predefined rotation angle position for a set-point start of transmission, for example the rotation angle position at which an ideal course of the signal of an acceleration sensor delivers the value $-1g$. This wheel position is denoted in the following as 0°. As FIGS. 1 and 2 show, this point in time can however only be determined with a degree of uncertainty, which is characterised by interval I1 or I2. This degree of uncertainty can be indicated in the data telegram, for example by indicating the size of the interval with the accuracy whereof the point in time can be determined at which the predefined rotation angle position for the set-point start of transmission is reached. The data telegram can contain a numerical value, which indicates the length of the interval in question. Another possibility consists for example in the data telegram containing only one additional bit, which indicates whether the point in time at which the predefined reposition has been reached was determined with the accuracy of a small interval I1 or a large interval I2.

A central evaluation unit receives the data telegrams of the various tire pressure monitoring units, which each contain a characteristic identifier of the monitoring unit in question, and evaluates this information, in order to assign the tire pressure monitoring unit concerned to a wheel position. When the data telegram is received, the rotation angle position determined by an ABS sensor is also detected for each of the wheels coming into question and compared with rotation angle positions 0°, at which the tire pressure monitoring unit has started the transmission of the data telegram.

On account of unavoidable measurement errors both of the tire pressure monitoring unit and also of the ABS sensor, the points in time ascertained by the tire pressure monitoring unit and the ABS sensor at which the wheel position 0° is reached do not perfectly agree, so that an assignment of a tire pressure monitoring unit to a wheel position can only be carried out by evaluating a plurality of data telegrams. According to the invention, a statistical evaluation is carried out for this purpose, wherein data telegrams in which the reliability of the information derived from the acceleration data is higher receive a greater weighting and data telegrams in which the reliability of the information derived from the acceleration data is lower are taken into account with a lower weighting.

The central evaluation unit of the tire pressure monitoring system considers for this purpose a plurality of data telegrams which have been received after one another and ascertains for which ABS sensor with which tire pressure monitoring unit, which is identified by its characteristic identifier, the greatest agreement with regard to wheel positions is present. This assignment can be improved by the fact that the data telegrams with which the wheel position in question was able to be determined with greater reliability receive a greater statistical weighting; in the represented example of embodiment, these are therefore the data telegrams with which the respective wheel position 0° was able to be ascertained in the smaller interval I1. A straightforward option consists in providing data telegrams with the smaller interval I1 with twice the weighting of data telegrams with the greater interval I2.

Figure 3:
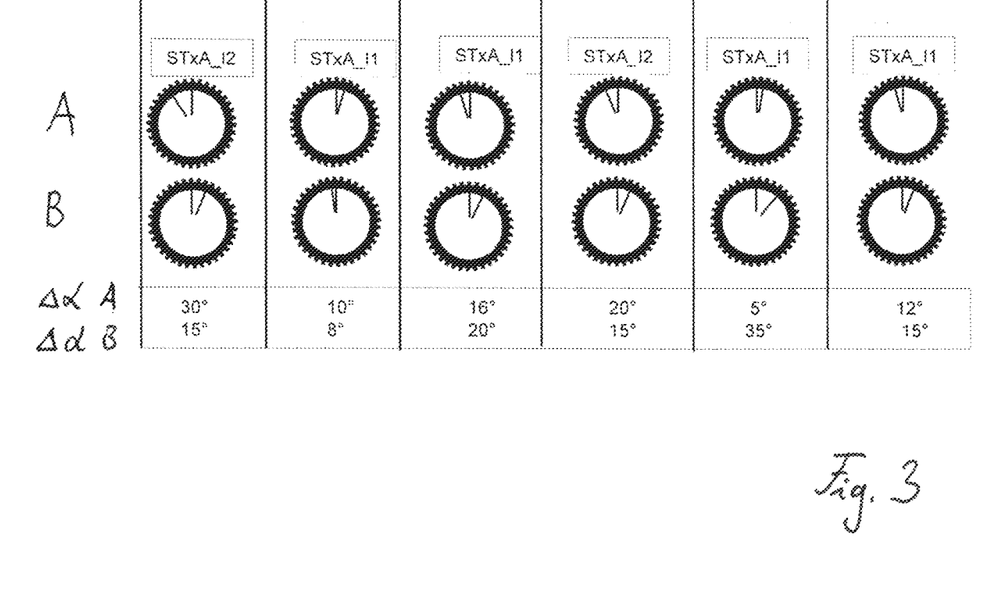
FIG. 3 shows a diagrammatic representation for an assignment of a tire pressure monitoring unit to a wheel position A and respectively B taking account of rotation angle positions of the wheel in question determined by means of ABS sensors.

FIG. 3 shows diagrammatically the way in which a tire pressure monitoring unit can be assigned to a wheel position A or B. In FIG. 3, it is assumed that the tire pressure monitoring unit should only transmit a data telegram if the wheel in question has reached the 12 o'clock position. In FIG. 3, the rotation angle position that is measured upon receipt of a data telegram from an ABS sensor of wheel position A and an ABS sensor of wheel position B is entered for each of six different data telegrams. The deviation Δα of the rotation angle position measured by the ABS sensor from the ideal 12 o'clock position or 0° position is indicated in FIG. 3 in each case for two wheel positions as Δα A and respectively Δα B. In addition, it is indicated in each case whether the wheel position was able to be ascertained by the tire pressure monitoring unit with greater reliability (STxA_I1), i.e. within the small interval I1, or only with a lesser degree of reliability (STxA_I2), i.e. within the larger interval I2. The transmission of the data telegram can be started at the end of the interval, as is indicated in FIGS. 1 and 2, or at an arbitrary point in time within the interval I1 or I2.

In the represented example of embodiment, deviations Δα at the level of 30°, 10°, 16°, 20°, 5° and 12° result for wheel position A. With simple weighting of all six examples, this gives a mean value of 15.5°. For wheel position B, the six examples represented in FIG. 3 produce deviations of 15°, 8°, 20°, 15°, 35° and 15°. With simple weighting of all the data telegrams, this gives a mean value of 18.0°. The mean deviation in the case of wheel position B is therefore somewhat greater. This speaks in favour of an assignment of the tire pressure monitoring device to wheel position A, although this assignment is quite uncertain.

A clearer assignment can be achieved by the fact that data telegrams with greater accuracy, i.e. the smaller interval I1, are weighted double and data telegrams with the interval I2 are weighted only once. In this case, a weighted mean value of 13.6° results for wheel position A and a weighted mean value of 18.6° for wheel position B. The assignment of the tire pressure monitoring unit in question to wheel position A can thus be carried out much more reliably.

Figure 4:
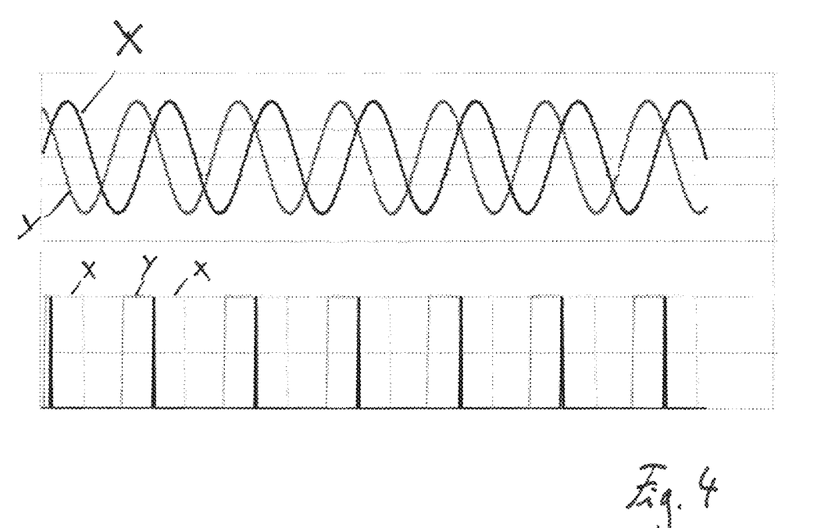
FIG. 4 shows signals from two acceleration sensors, which are sensitive in two directions at right angles to one another, as well as a digitalization of these signals.
Figure 5:
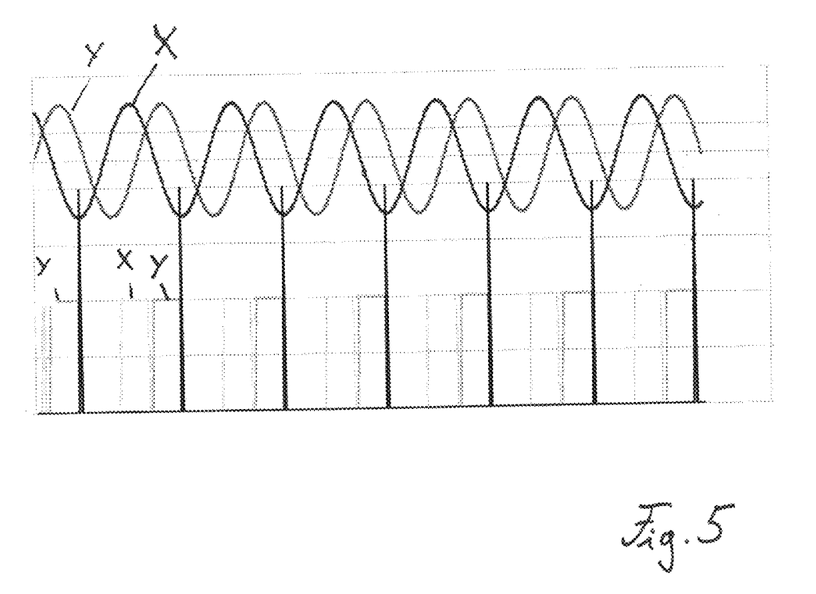
FIG. 5 shows a representation according to FIG. 4 with a reversed direction of rotation.
Figure 6:
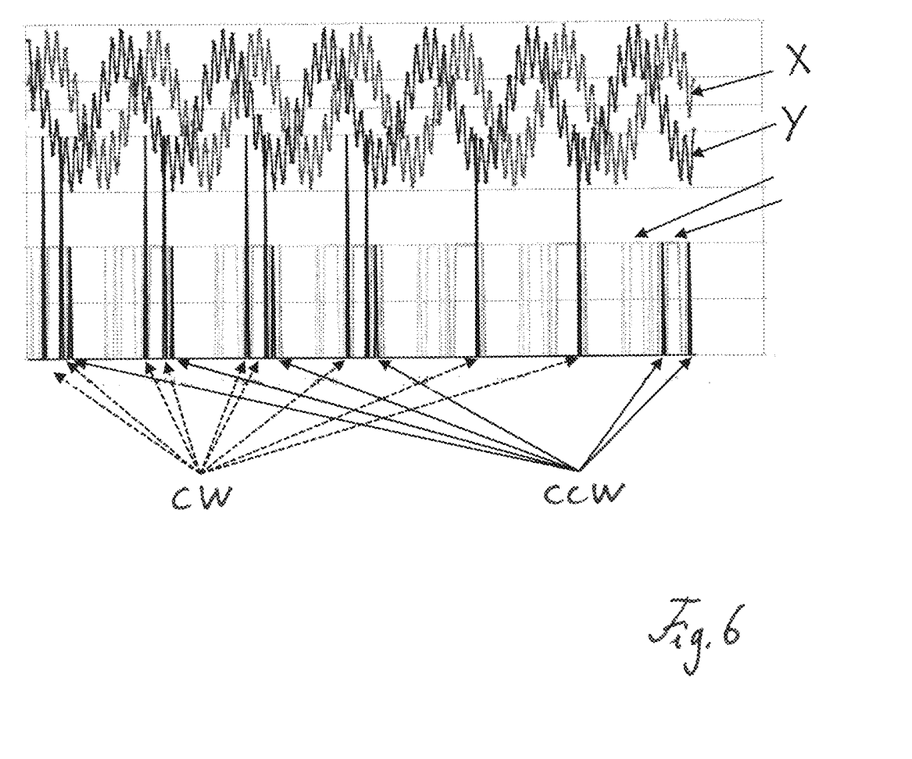
FIG. 6 shows a representation according to FIG. 4 with interfering influences.

FIGS. 4 to 6 relate to the detection of the direction of rotation of a wheel by means of signals from two acceleration sensors, which are sensitive in two spatial directions at right angles to one another, i.e. in the X-direction (radial) and Y-direction (tangential). As FIG. 4 shows, the signal of the acceleration sensor sensitive in the X-direction and the signal of the acceleration sensor sensitive in the Y-direction are 90° phase-shifted. This phase position is reversed when the direction of rotation of the wheel is reversed, which is represented in FIG. 5. FIG. 4 shows by way of example the courses of the signals with a wheel rotation in the anticlockwise direction, FIG. 5 with a wheel rotation in the clockwise direction.

The phase position of the signals of the two acceleration sensors can thus be used to distinguish between anticlockwise-rotating wheels and clockwise-rotating wheels. The acceleration signal can be digitalised for the determination of the phase position, which is represented in each case in the lower half of the image of FIGS. 4 and 5. For this purpose, the value 1 can for example be assigned in each case to the signals when the sinusoidal signal has a value of 0.5 or more. Moreover, the value of the digitalised signal is zero in the example of FIGS. 4 and 5. By means of a logic check, it can then be ascertained from the digitalised signals whether the signal of the sensor sensitive in the X-direction or the signal of the sensor sensitive in the Y-direction is ahead in its phase position. The direction of rotation of the wheel can be unequivocally determined in each case with the courses of the signals shown in FIGS. 4 and 5, since a high value of the digitalised signal of the sensors sensitive in the X-direction always follow a high value of the digitalised signal of the sensors sensitive in the Y-direction (FIG. 4) and conversely (FIG. 5).

When the signals at the acceleration sensors are very noisy, as is represented diagrammatically in FIG. 6, a corresponding evaluation no longer leads to an unequivocal result. In the example of embodiment shown in FIG. 6, 10 changes of the digitalised signals of the acceleration sensors result, which indicate a rotation in the clockwise direction (CW), and 6 changes of the digitalised signals, which indicate a rotation in the anticlockwise direction (CCW). It cannot be reliably decided on the basis of such a result whether the wheel in question is rotating in the clockwise direction or anticlockwise direction.

The tire pressure monitoring unit has only a little time available before the transmission of a data telegram, typically only several wheel rotations. Sometimes, even on the basis of only a few wheel rotations, a reliable result concerning direction of rotation can be ascertained despite interfering influences, for example if 75% or more ascertained phase positions indicate a specific direction of rotation. In the case of the result of FIG. 6 described above, the result with 10 to 6 is not however so clear.

Instead of transmitting no information at all concerning the direction of rotation, the tire pressure monitoring unit can for example indicate in a data telegram that the direction of rotation of the example of FIG. 6 is in the clockwise direction (CW) and in addition place a flag in the data telegram, which indicates that this information concerning the direction of rotation is uncertain. Another possibility consists in stating a value in the data telegram, which quantifies the uncertainty, i.e. correlates the latter with the probability that the indicated direction of rotation is correct, or indicates this probability explicitly. For this purpose, a value 10/6 for example can be transmitted in the data telegram for the example of FIG. 6 or the number of ascertained phase positions can be explicitly indicated, which speak in favour of a rotation in the clockwise direction (i.e. 10) and in favour of a rotation in the anticlockwise direction (i.e. 6).

The central evaluation unit of the system can then evaluate unreliable information together with further information and thus arrive at a reliable result. The further information can, in the simplest case, be further data telegrams of the same tire pressure monitoring unit. For example, unreliable information concerning the direction of rotation can be classified as reliable if this unreliable information is contained in a plurality of data telegrams following one another. A threshold value for the number of data telegrams can be established that must follow one another with unreliable information, in order for the information to be classified as reliable, for example at least 3 or at least 4 successive data telegrams with corresponding information concerning the direction of rotation.

Another possibility consists in taking account of data telegrams of other tire pressure monitoring units of the vehicle. That is to say that the central evaluation unit can proceed on the basis that half of the wheels are rotating in the clockwise direction and the other half in the anticlockwise direction. Alternatively or in addition, the central evaluation unit can also take account of other vehicles sensors in the evaluation.

What is claimed is:

1. A method for assigning a tire pressure monitoring unit, which is mounted on a wheel of a vehicle and comprises at least one pressure sensor and at least one acceleration sensor, to a wheel position of the vehicle, the method comprising the steps of:
    determining pressure and acceleration data from measurements of the at least one pressure sensor and the at least one acceleration sensor;
    transmitting wirelessly the pressure data and information derived from the acceleration data in a data telegram together with a characteristic identifier of the tire pressure monitoring unit to a central evaluation unit;
    acquiring information concerning the reliability of the information derived from the acceleration data in the tire pressure monitoring unit on the basis of the measurements and determining, via the tire pressure monitoring unit, the reliability of the information derived from the acceleration data;
    transmitting the reliability of the information derived from the acceleration data as an interval with the data telegram to the central evaluation unit;
    considering a plurality of data telegrams by the central evaluation unit, taking account of data from ABS sensors; and
    assigning the individual tire pressure monitoring units to the wheel positions of the vehicle, wherein in this assignment, data telegrams in which the reliability of the information derived from the acceleration data is higher receive a greater weighting and data telegrams in which the reliability of the information derived from the acceleration data is smaller are taken into account with a smaller weighting;
    wherein the data telegrams receive a weighting in the evaluation which is proportional to the reliability of the information derived from the acceleration data.

2. The method according to claim 1, wherein a rotation angle position of the wheel for a set-point start of transmission is defined and the transmission of the data telegram is started at a point in time at which the wheel is located according to the acceleration data in the rotation angle position for the set-point start of transmission, wherein the information concerning the reliability of the information derived from the acceleration data indicates the interval around the rotation angle position for the set-point start of transmission, in which interval the wheel was located when the transmission of the data telegram was started.

3. The method according to claim 2, wherein it is determined for each wheel from data from ABS sensors in which rotation angle position it was located when the transmission of the data telegram was started, and the deviation of this ascertained rotation angle position from the rotation angle position for the set-point start of transmission is calculated for each wheel, wherein a weighted mean value of the deviations is calculated for each wheel from a series of data telegrams, which each contain the same characteristic identifier, and the tire pressure monitoring unit of the respective characteristic identifier is assigned to the wheel for which the weighted mean value of the deviations is the smallest, wherein, in the calculation of the weighted mean value, deviations which have been calculated for the data telegrams for which the reliability of the information derived from the acceleration sensors is higher receive a greater weighting, and data telegrams in which the reliability of the information derived from the acceleration data is smaller are taken into account with a smaller weighting.

4. The method according to claim 1, wherein the acceleration data from the acceleration measurements of a first acceleration sensor, which is sensitive for accelerations in a first direction, and acceleration measurements of a second acceleration sensor, which is sensitive for accelerations in a second direction at right angles in the first direction, are obtained.

5. The method according to claim 4, wherein the information derived from the acceleration data indicates the direction of rotation.

6. The method according to claim 5, wherein the information concerning the reliability of the information derived from the acceleration data correlates with the probability that the direction of rotation transmitted by the tire pressure monitoring unit is correct.

7. The method according to claim 1, wherein the information concerning the reliability of the information derived from the acceleration data is contained in the data telegram as a flag.

8. A system for tire pressure monitoring with tire pressure monitoring units, which operates according to the method of claim 1, wherein the central evaluation unit, which receives and evaluates data telegrams transmitted by the tire pressure monitoring units, evaluates the information derived from the acceleration data contained in the data telegram taking account of the information concerning the reliability of this information derived from the acceleration data as well as other data which are supplied by ABS sensors.

9. A method for assigning a tire pressure monitoring unit, which is mounted on a wheel of a vehicle and comprises at least one pressure sensor, a first acceleration sensor sensitive for accelerations in a first direction, and a second acceleration sensor sensitive to accelerations in a second directions at right angles to the first direction, to a wheel position of the vehicle, the method comprising the steps of:
    determining pressure and acceleration data from measurements of the at least one pressure sensor and the first and second acceleration sensors;
    transmitting wirelessly the pressure data and information derived from the acceleration data in a data telegram together with a characteristic identifier of the tire pressure monitoring unit;
    acquiring information concerning the reliability of the information derived from the acceleration data in the tire pressure monitoring unit on the basis of the measurements;
    transmitting this information concerning the reliability of the information derived from the acceleration data as a flag with the data telegram;
    considering a plurality of data telegrams by a central evaluation unit, taking account of data from ABS sensors; and
    assigning the individual tire pressure monitoring units to the wheel positions of the vehicle, wherein in this assignment, data telegrams in which the reliability of the information derived from the acceleration data is higher receive a greater weighting and data telegrams in which the reliability of the information derived from the acceleration data is smaller are taken into account with a smaller weighting;
    wherein a rotation angle position of the wheel for a set-point start of transmission is defined and the transmission of the data telegram is started at a point in time at which the wheel is located according to the acceleration data in the rotation angle position for the set-point start of transmission, wherein the information concerning the reliability of the information derived from the acceleration data indicates an interval around the rotation angle position for the set-point start of transmission, in which interval the wheel was located when the transmission of the data telegram was started.

10. A method for assigning a tire pressure monitoring unit, which is mounted on a wheel of a vehicle and comprises at least one pressure sensor, a first acceleration sensor sensitive for accelerations in a first direction, and a second acceleration sensor sensitive to accelerations in a second directions at right angles to the first direction, to a wheel position of the vehicle, the method comprising the steps of:
  determining pressure and acceleration data from measurements of the at least one pressure sensor and the first and second acceleration sensors;
  transmitting wirelessly the pressure data and information derived from the acceleration data in a data telegram together with a characteristic identifier of the tire pressure monitoring unit;
  acquiring information concerning the reliability of the information derived from the acceleration data in the tire pressure monitoring unit on the basis of the measurements;
  transmitting this information concerning the reliability of the information derived from the acceleration data as a flag or an interval with the data telegram;
  considering a plurality of data telegrams by a central evaluation unit, taking account of data from ABS sensors; and
  assigning the individual tire pressure monitoring units to the wheel positions of the vehicle, wherein in this assignment, data telegrams in which the reliability of the information derived from the acceleration data is higher receive a greater weighting and data telegrams in which the reliability of the information derived from the acceleration data is smaller are taken into account with a smaller weighting;
  wherein a rotation angle position of the wheel for a set-point start of transmission is defined and the transmission of the data telegram is started at a point in time at which the wheel is located according to the acceleration data in the rotation angle position for the set-point start of transmission, wherein the information concerning the reliability of the information derived from the acceleration data indicates the interval around the rotation angle position for the set-point start of transmission, in which interval the wheel was located when the transmission of the data telegram was started.

* * * * *